Figure 1:
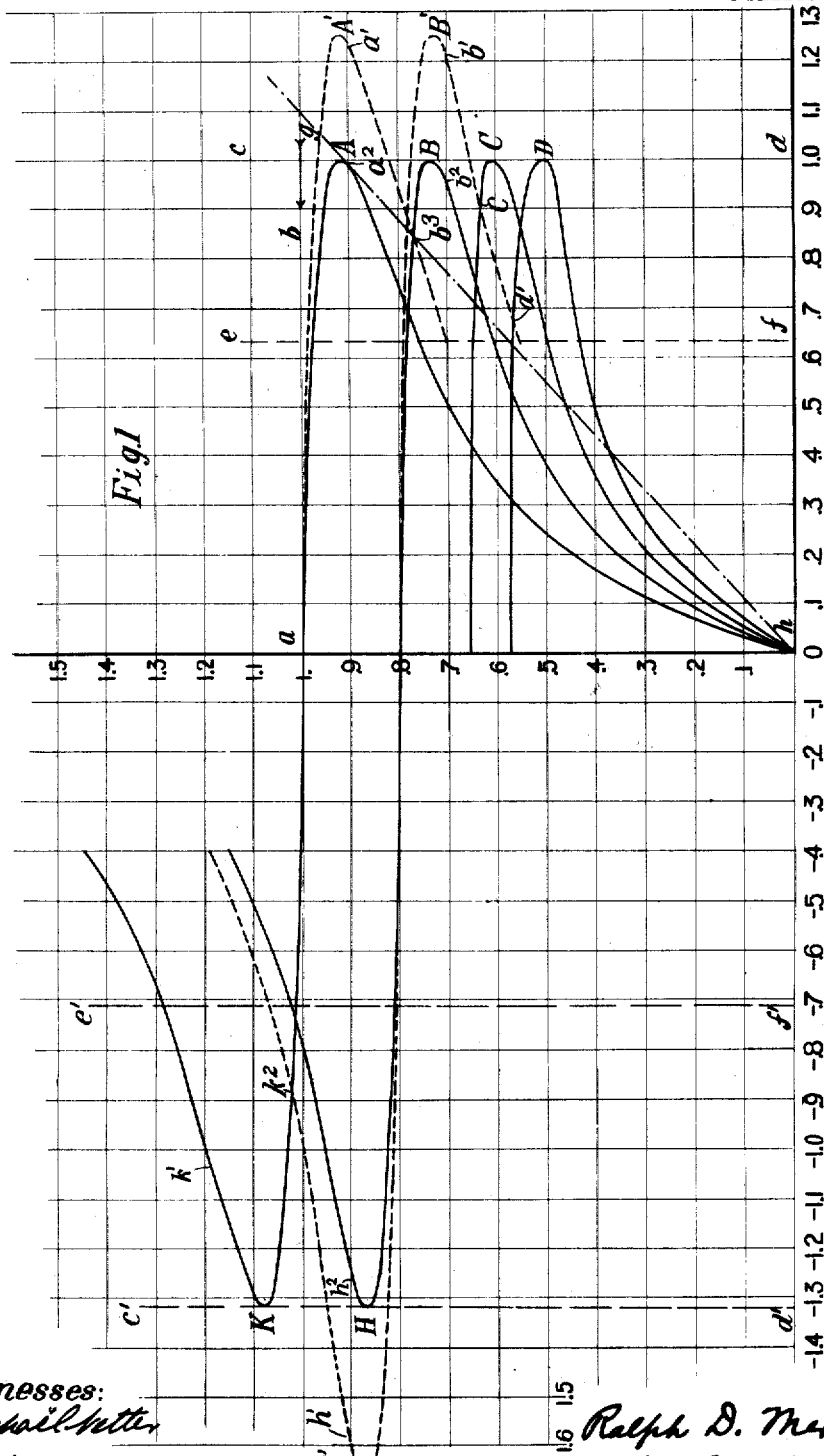

R. D. MERSHON.
METHOD OF OPERATING ALTERNATING CURRENT MOTORS.
APPLICATION FILED JAN. 25, 1904.

913,415.

Patented Feb. 23, 1909.

R. D. MERSHON.
METHOD OF OPERATING ALTERNATING CURRENT MOTORS.
APPLICATION FILED JAN. 25, 1904.

913,415.

Patented Feb. 23, 1909.
6 SHEETS—SHEET 2.

Witnesses:
Raphaël Netter
A. A. Dunham.

Ralph D. Mershon Inventor
by Kerr, Page & Cooper Attys

R. D. MERSHON.
METHOD OF OPERATING ALTERNATING CURRENT MOTORS.
APPLICATION FILED JAN. 25, 1904.

913,415.

Patented Feb. 23, 1909.
6 SHEETS—SHEET 4.

Witnesses:
Raphael Petter
A. S. Dunham

Ralph D. Mershon Inventor
by Kerr, Page & Cooper Attys.

R. D. MERSHON.
METHOD OF OPERATING ALTERNATING CURRENT MOTORS.
APPLICATION FILED JAN. 25, 1904.
913,415.
Patented Feb. 23, 1909.
6 SHEETS—SHEET 5.
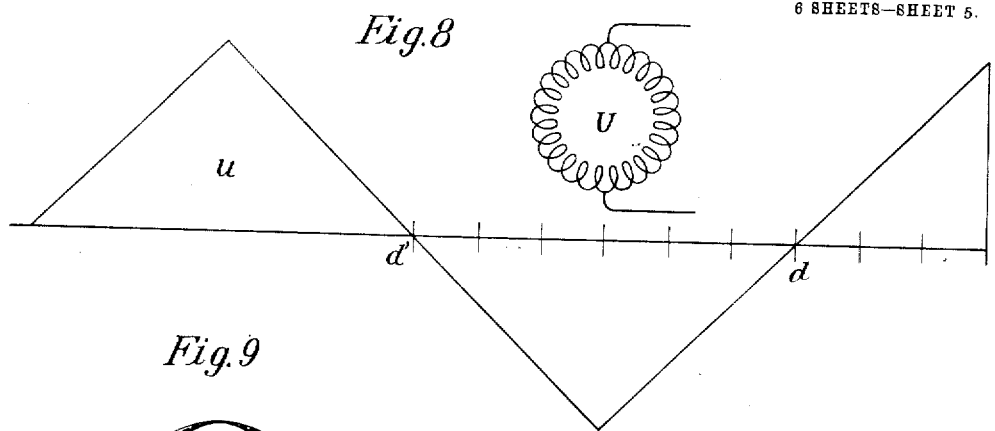
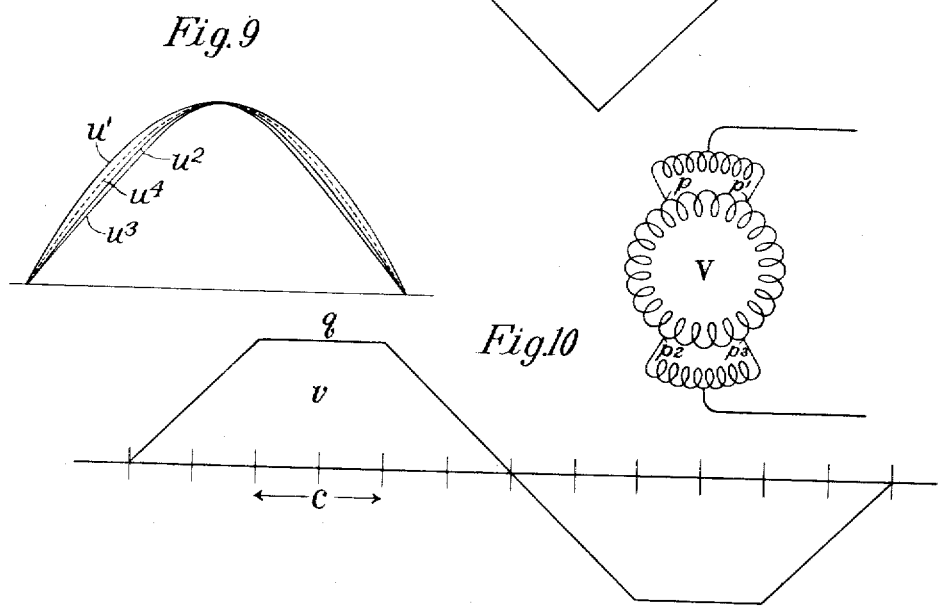
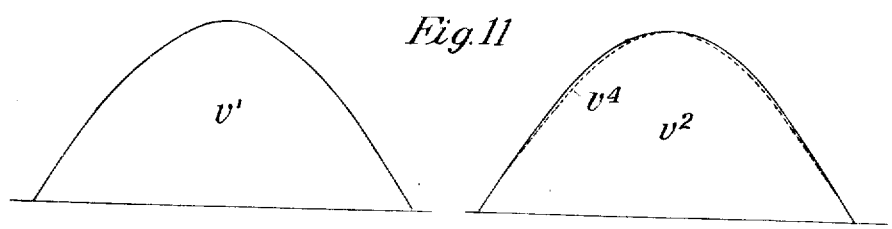
Witnesses:
Raphael Netter
A. S. Dunham
Inventor
Ralph D. Mershon
by Kerr, Page & Cooper Attys.

R. D. MERSHON.
METHOD OF OPERATING ALTERNATING CURRENT MOTORS.
APPLICATION FILED JAN. 25, 1904.
913,415.
Patented Feb. 23, 1909.
6 SHEETS—SHEET 6.
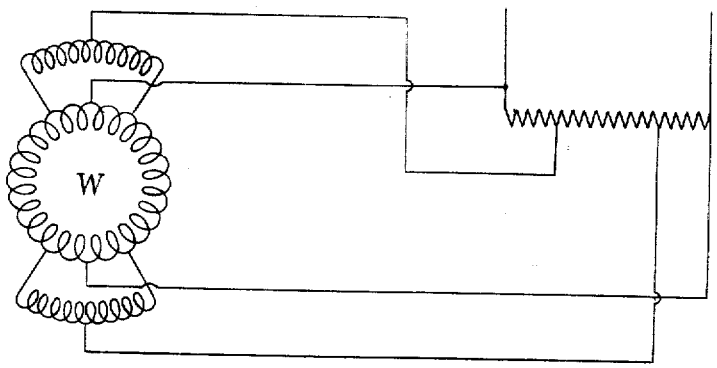
*Fig.14*
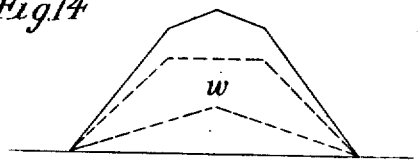
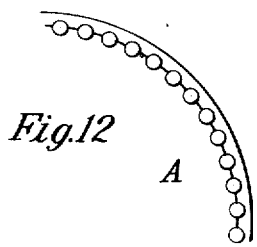
*Fig.12*
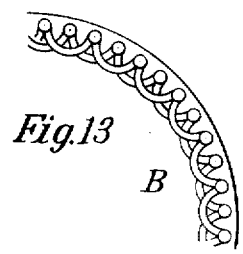
*Fig.13*
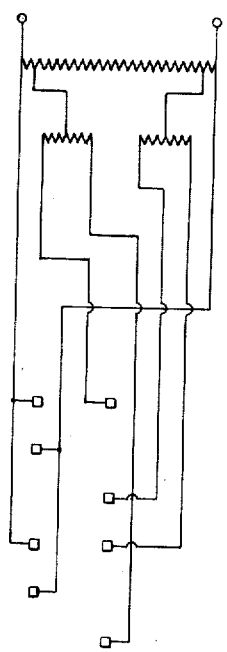
*Fig.15*
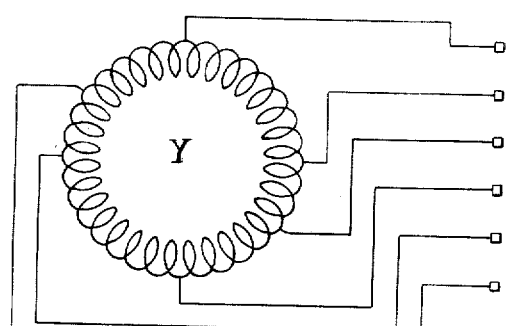
Witnesses:
Raphael Netter
A. S. Dunham.
Ralph D. Mershon Inventor
by Kerr, Page & Cooper Attys.

UNITED STATES PATENT OFFICE.

RALPH D. MERSHON, OF NEW YORK, N. Y.

METHOD OF OPERATING ALTERNATING-CURRENT MOTORS.

No. 913,415.  Specification of Letters Patent.  Patented Feb. 23, 1909.

Application filed January 25, 1904. Serial No. 190,440.

*To all whom it may concern:*

Be it known that I, RALPH D. MERSHON, a citizen of the United States, residing at New York, in the county and State of New York, have invented a certain new and useful Method of Operating Alternating-Current Motors, of which the following is a specification, reference being had to the drawings accompanying and forming part of the same.

My invention relates to the operation of alternating current motors, more particularly for the purpose of varying the speed thereof.

As is well known, the chief obstacle, if not practically the only obstacle, to the use of alternating current motors where direct current machines are now employed is the fact that at present known to the art there is no method of varying the speed of an alternating current motor which does not possess serious defects. In operating railways, elevators, and other apparatus, in which considerable variation of speed is necessary or desirable, the direct current motor is now almost universally used, although in many other respects the alternating current motor is preferable. A number of ways have been proposed, and to some extent used, for obtaining the capability of speed variation so much desired. One method is to use a rheostat in the secondary, in the well known manner. This secures the desired result, but with such a loss in the efficiency of the alternating current motor as to render the plan objectionable. Another method, known as "concatenated control", is sometimes used where two or more motors are connected to the same load, but in this case a rheostat must be employed with at least one of the motors, besides other objections inherent to the "concatenated" connection. Still another method is to vary the number of poles in the energizing circuits, with corresponding change of speed, but, as heretofore practiced, the loss in efficiency by this method may be so great as to be prohibitive. Recourse must therefore generally be had to direct current machines, although, as before stated, the alternating current motor is in many other respects superior.

In some cases the necessity of using direct current motors becomes particularly objectionable, as when power is to be transmitted over long distances, over a system of distribution many miles in extent, or from a distant water power or other source. Under such conditions it is necessary to generate alternating current, transmit it at high tension to the point of utilization, and then, by means of costly apparatus and attendance, convert it into direct current. The power must be transmitted by alternating current, since with direct current the loss in transmission would be enormous unless the conductors were impractically large or expensive. Having by means of the efficient and economical alternating apparatus delivered the power to the point where it is to be utilized, the current must then be rectified, with a resulting loss of a large proportion of the previous saving, merely because alternating current motors do not possess that practical capability of speed control which is so indispensable.

To avoid the necessity, and consequent expense, of rectifying the current, a system has been proposed, particularly for use in connection with railways, in which the alternating current from the line energize a motor on the locomotive or car, which in turn drives a direct current generator, also on the car. Current from the latter generator is then supplied to a second direct current motor, also on the car, which in turn propels the vehicle. This plan has advantages for certain purposes, but, at best, it always requires three machines to do the work of one, on each propelling vehicle. By operating a motor according to my invention, however, the speed may be varied as readily as in a direct current machine, without the defects of the latter, such as large rheostatic losses and the disadvantages of a commutator, and at the same time my method will be found to possess none of the objectionable features found in the previous methods of varying the speed of an alternating current motor. The invention also possesses numerous positive advantages. In the first place, since it enables a motor to be employed which is operated by alternating currents, the use of rotary converters and their maintenance are dispensed with, and the economy of alternating current generation is therefore preserved. In long distance transmission the only intermediate apparatus required is the transformer or transformers necessary to step-down the voltage to the proper point. Again, no rheostat is necessarily used, and there need therefore be no rheostatic loss when the motor is running at less than normal or full load speed. For example, in bringing the motor and its load from rest to maximum speed, or in running at any speed less than maximum, there would be no loss of power in a rheostat, and the motor, at an intermediate speed as well as at maximum, consumes approximately only so much power as is required to carry the load at that particular speed. A further advantage, and one of the most important, is the economy effected in stopping the load, or bringing it from a higher to a lower speed. In such cases the inertia of the moving masses, or, stated otherwise, the kinetic energy stored in the load, instead of being wasted in the brakes, is transformed into electrical energy by the motor and is delivered to the supply circuit to be utilized by other motors or translating devices connected therewith. This feature of the invention is of special value in traction systems, where heavy trains, with enormous inertia, have to be brought from high speed to a stop. The potential energy of the load is also transformed into electrical energy and delivered to the line, as for example in the case of a train running down grade. Here, as before, instead of applying the brakes to keep down or reduce the speed, the motor itself receives the energy and returns it to the supply circuit. Another instance which may be mentioned in this connection is a descending elevator car. Here the potential energy, which is not inconsiderable, may be returned to the supply circuit and utilized to aid in raising other cars. In fact, it may be said, generally, that the motor will consume approximately only enough power to carry the load at the desired speed, whatever that may be, and that when from any cause the load itself is developing power the same may be transformed into useful energy and returned to the supply circuit, instead of being wasted as is now commonly the case.

The invention itself, which is based on the principle of varying the number of poles in the motor, will be more readily understood when explained in connection with the accompanying drawings, in which—

Figure 2:
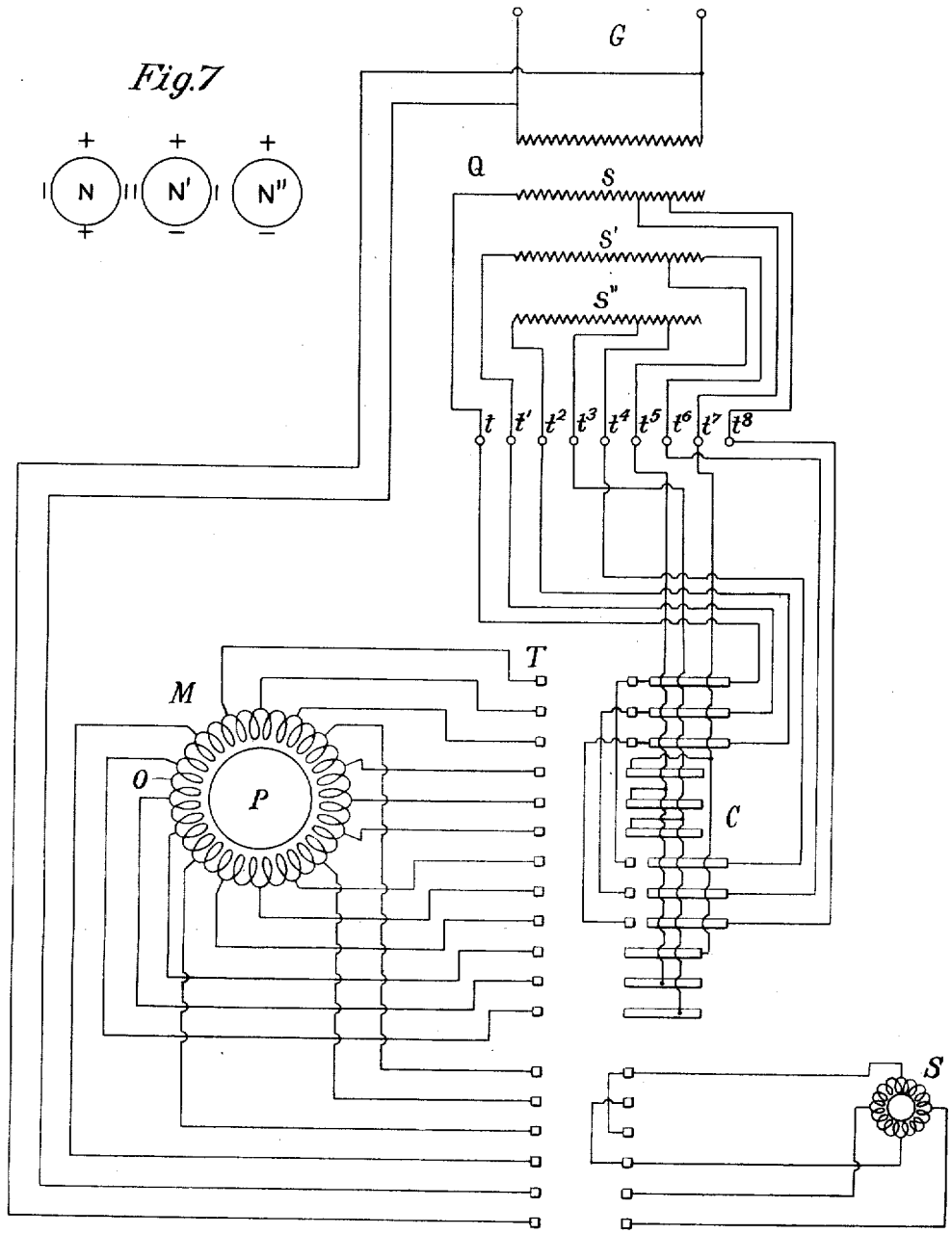
Figure 3:
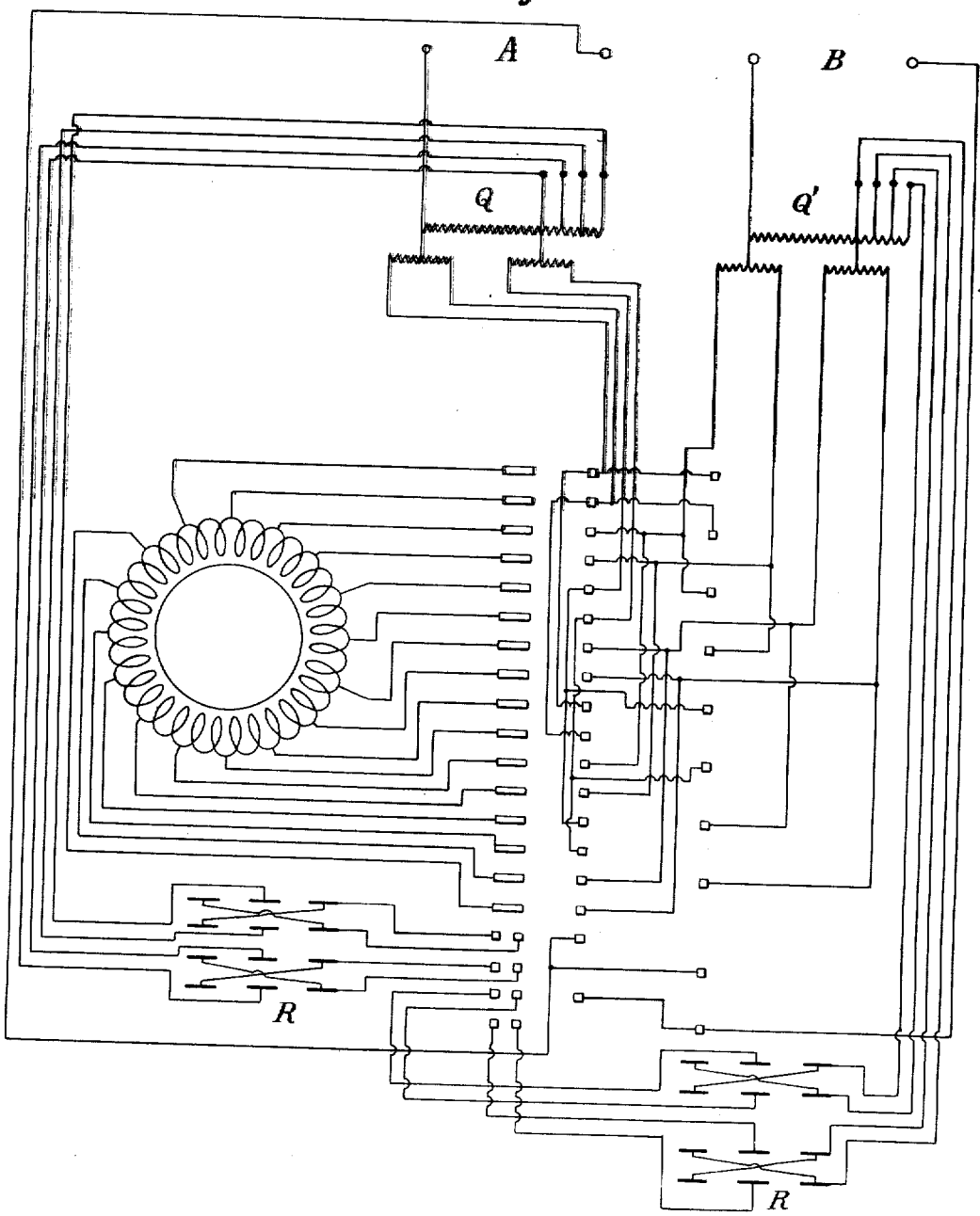
Figure 4:
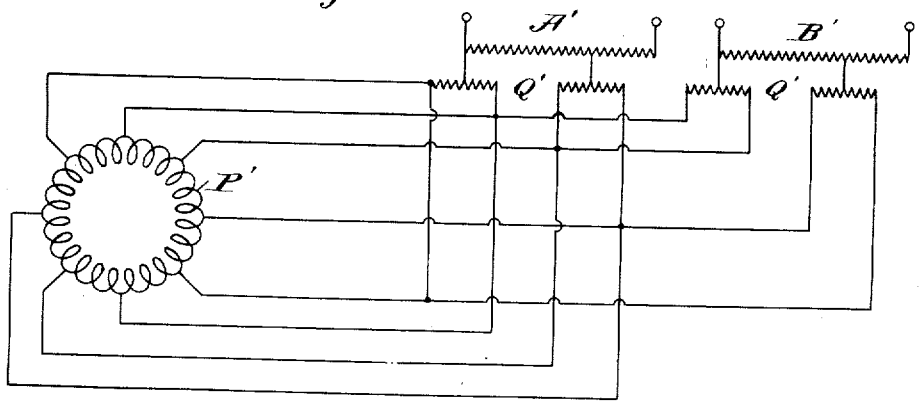
Figure 5:
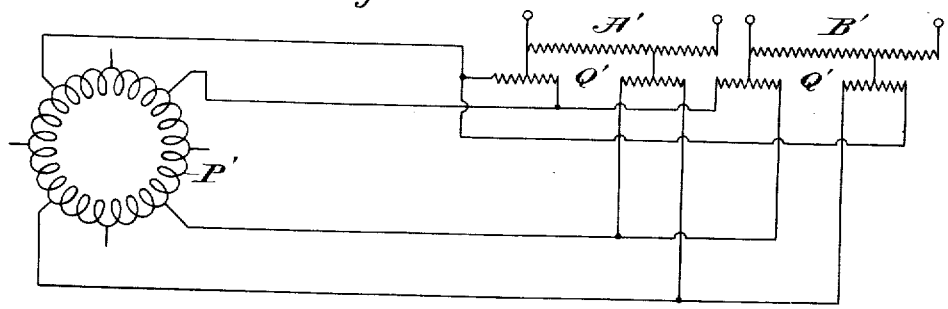
Figure 6:
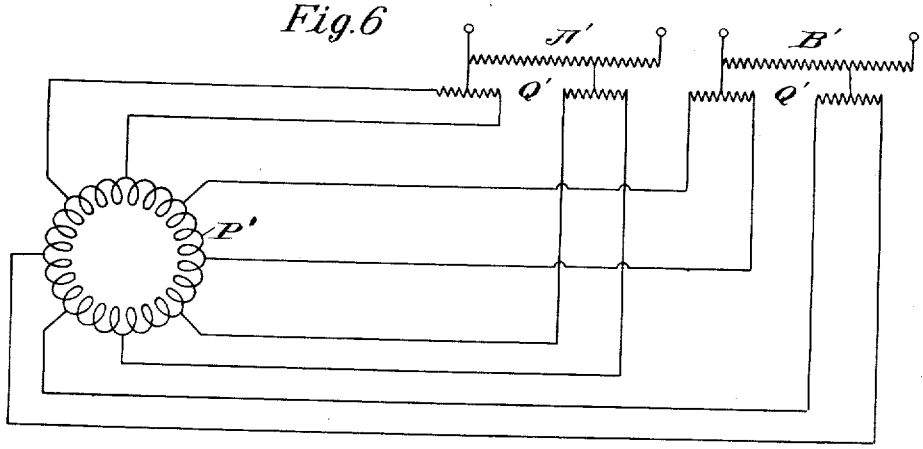

Figure 1 is a diagram in which the curves therein shown represent the performance of a single phase induction motor with various numbers of poles, operating both as a motor and as a generator. Fig. 2 is a diagram showing a typical system arranged for the practice of my invention, in the case of a single phase induction motor. Fig. 3 shows diagrammatically a system arranged for practicing my invention in the case of a two-phase motor. In the arrangement shown, the motor is adapted to be operated with four poles and with two poles. Fig. 4 shows another arrangement of connections to give four poles. Fig. 5 shows the connections for two poles. Fig. 6 illustrates another arrangement for two poles in a two-phase motor. Fig. 7 is a diagram illustrating a novel method of effecting a change from one number of poles to another. Fig. 8 is a diagram showing a two-pole induction motor and the flux distribution therein. Fig. 9 shows flux waves in the secondary for various widths of circuit. Fig. 10 is a diagram showing a two-pole induction motor with two leads per pole, and the resulting flux distribution. Fig. 11 shows flux waves in the secondary of this motor for various widths of circuit. Fig. 12 shows the ordinary method of constructing the secondary, and Fig. 13 shows a novel construction for securing any desired width of circuit in the secondary. Fig. 14 shows a two-pole single phase motor, with the current led in at three points per pole, and shows also the form of the flux wave resulting from such connection. Fig. 15 illustrates a system, with a single phase motor, for practicing my invention in changing the number of poles and securing a desired flux distribution.

The apparatus shown in the drawings have Gramme ring windings only, but it will, of course be obvious that this type is merely illustrative, and that the invention is applicable to any other suitable winding, as for example drum windings.

Referring now to Fig. 1, in which is represented by means of curves the performance of a single phase induction motor with various numbers of poles, on the vertical axis is plotted the speed of the motor in percentage of the synchronous speed, which corresponds to the least number of poles at which the motor is to operate. On the horizontal axis, to the right, is plotted the positive torque of the motor in coming to a higher speed, and to the left, the negative torque in coming to a lower speed; both in percentage of the maximum positive torque which the motor can exert. The value at which the line a—b cuts the vertical axis is that of synchronous speed for the least number of poles; the values at which the lines c—d and c'—d' cut the horizontal axis are those of maximum torque, positive and negative respectively; while the lines e—f and e'—f' indicate respectively a positive and a negative torque less than maximum which may be called the rated or normal torque. These curves, as previously stated, are those for a single phase induction motor, but the corresponding curves for a polyphase motor are similar, the main difference being that the polyphase curve instead of passing through zero cuts the horizontal axis at a torque value depending upon the design of the motor. In all other respects, however, the two classes of curves are very similar, and the following explanation for the single phase applies equally well to the polyphase except that in the latter case auxiliary starting means would not necessarily be employed. Disregarding for the present the dotted curves, the curve A represents the performance of a motor when running with its least number of poles. It will be observed that in this case the speed rises more rapidly than the torque up to a certain point, after which the torque increases rapidly to a maximum at a speed slightly lower than synchronous. The discrepancy between the curve of actual performance and the straight line $g$—$h$, which represents what would be the performance of the system if the speed and the torque rose together until maximum torque were reached, is wide. Since it is a fact that with a greater number of poles maximum torque will be reached at a speed proportionately lower than the synchronous speed of the first case, other curves may be plotted by which the actual performance of the motor with various numbers of poles may be compared.

In Fig. 1 the curve A may be understood to be the curve resulting with 8 poles. Increasing the number to 10, or 10/8 of the former number, the curve B results, the curves C and D showing the performance with successive increases in the number of poles. In the case of curve B, the synchronous speed is 80 per cent. of the first; in curve C there are 12/8 the first number of poles, and the synchronous speed is therefore 66 2/3 per cent.; in curve D 14/8 the first number of poles are used, and the synchronous speed is therefore 57 1/7 per cent.; and so on for as great a number of poles as desired. It will now be seen that with such a motor as this, if the torque required of it were no greater than that where the line $e$—$f$ cuts the horizontal axis, the motor could be "started", that is, brought to its normal speed, or the speed corresponding to its least number of poles, by bringing it, as by means of any auxiliary device, either mechanical or electrical, to the comparatively low speed corresponding to its greatest number of poles, or approximately to that speed; the number of poles is then decreased to such a number that, with the speed previously existing, the torque with the new number of poles will not fall below the predetermined torque, such as for example that indicated by the line $e$—$f$. Stated otherwise, the reduction in the number of poles must be such that the point of intersection of the curves D and C falls beyond the line $e$—$f$. The reduction having been effected, the motor, and the load to which it may be connected is allowed to increase in speed toward synchronism for the new number of poles. When its speed has increased sufficiently the number of poles may be again reduced, in substantially the same manner as before. After this step the speed of the motor and load will again increase; and by repeating such steps as often as necessary the motor and load may finally be brought to the speed corresponding to what may be termed its normal number of poles. In other words, the single phase motor when operated according to my method becomes, from a comparatively low speed, a self-starting and variable speed motor by a simple commutation of its poles. This commutation can be performed by a process of manipulation comparable to that of a starting rheostat or other controlling mechanism. At any intermediate speed, moreover, this motor would operate as a constant speed motor for that particular number of poles. That is, under any load which it is capable of carrying, it runs at approximately constant speed; whereas the speed of a motor controlled by a rheostat falls off as the load is increased, unless the rheostat be manipulated. It should be further noted that whereas in the case of an ordinary single phase motor, for example one represented by curve A, started by electrical auxiliary means, a power component proportional to the maximum synchronous speed of the motor must be supplied by the auxiliary starting device, in the present case the component required is proportional only to the synchronous speed of the greatest number of poles. For instance, if the motor have an output of 100 H. P. at the least number of poles, and it be started with this number of poles, it will require at starting an auxiliary component of power proportional to 100 H. P.; but if its greatest number of poles be ten times that of the least number, it will require when starting with the greatest number an auxiliary component proportional to only 10 H. P.

Obviously any suitable device for supplying the out of phase component may be employed, such as re-actance coils, or condensers, or both, for connection to suitable points of the motor windings, or for deriving, externally to the motor, an out of phase component which will then be supplied to the motor, or an induction or synchronous polyphase motor receiving power in one phase from the main source and delivering the out of phase component from one or more other circuits of its winding.

As will be seen from Fig. 1, the speed rises by a series of steps. It is obvious that these steps may be made less abrupt by using a larger number of poles for the maximum speed and a proportionally larger number in starting, and increasing the number of steps in the complete reduction, so that the curves will more nearly merge. The solid line curves of Fig. 1 are those resulting when the voltage has throughout the entire operation, for each number of poles, the value which may be considered normal for that number of poles. If at any time, as for instance at the time of making the change from one number of poles to another, the voltage be made greater than the normal value, the torque which the motor can exert will in consequence be increased. The performance of the motor with varying numbers of poles and simultaneous abnormal increase in the voltage, is represented by the dotted curves in Fig. 1. Here it will be noted that the dotted curve B' cuts the curve C at a higher torque than does the curve B. This makes it possible to operate the motor with a higher torque than before, and as an example of this method, suppose the motor to be running on C; let the motor run up to the desired speed, as to the point $c$, then reduce the number of poles and increase the voltage, whereupon the motor will take the curve B'; after running on that curve until the desired speed is attained, say at the point $b'$, the voltage may be reduced to normal with consequent drop in torque (but no fall in speed) to a point $b^2$ on the curve B; running on this curve until the speed has increased the desired amount, as at the point $b^3$ the number of poles is again decreased, and the voltage abnormally increased, whereupon the motor takes curve A'; after rising in speed as desired, for instance, to the speed at $a'$, the voltage may be reduced again to normal; the torque then drops to the point $a^2$ on curve A. By this method the torque which the motor exerts through the operation may be made to approach the maximum torque at normal voltage as nearly as desired; or by proper variations in the voltage the torque at the instant of change of poles and throughout the consequent change of speed can be raised to practically any desired value. The same method may be employed to avoid the necessity of using a large number of steps in changing the number of poles. For example, starting on the curve D, suppose when the speed has reached the proper point, say at $d'$, the number of poles be reduced, not to the number corresponding to the curve C, but to a number somewhere between B and C. At the same time increase the voltage. The curve then resulting will cut the curve D at or beyond the line $e$—$f$, and the motor will, if the voltage be sufficiently abnormal, therefore increase in speed toward that corresponding to synchronism for the new number of poles; whereas if the voltage had not been increased the torque where the two curves will intersect would have been, or might have been, below that necessary to carry the load, as for example, that indicated by the line $e$—$f$. When the motor on the new curve has reached the desired speed, by reducing the number of poles to that corresponding to curve A, and simultaneously increasing the voltage, the motor may finally be brought to the speed of $a^2$, as before. In the latter case, however, it will be noted that only two changes in the number of poles were required to bring the motor up to its normal or maximum speed, without falling below the predetermined torque, while in the former instance three changes in the number of poles were required to bring the motor to the same ultimate speed.

It will be seen that there is a relation between the magnitude of the steps in changing the number of poles, the voltage impressed at the instant the change is made, and the torque of the load which the motor can bring up from its lowest to its highest speed. If the voltage impressed on the motor never be increased beyond that which may be considered normal for each number of poles, then the smaller the steps by which the number of poles is varied, the more nearly will the maximum load torque, which the motor can maintain as it increases in speed, approach the maximum torque that the motor can exert with any given number of poles at normal voltage. Or, with any given magnitude of step in changing the number of poles, the load torque which the motor can maintain throughout its range of speed may be made to approximate as closely as desired the maximum torque that the motor can exert with any given number of poles at normal voltage, by increasing, at the instant the change in the number of poles is made, the voltage to a value sufficiently above that which may be considered normal for the new number of poles. It will therefore be seen that by properly proportioning the magnitude of the pole changes, and the value of the voltage impressed at the time the change in the number of poles is made, it is possible to maintain, during the change from a speed corresponding to one number of poles to that corresponding to another, a torque equal to, or greater than, a predetermined torque, which predetermined torque is less than the maximum that the motor can exert with any given number of poles at normal voltage. In reducing the voltage to normal after an abnormal value has been employed for either of the purposes mentioned, it will generally be found advisable, if the abnormal increase were considerable, to make the reduction by two or more steps, in order not to make the drop in torque too sudden.

The operations described throughout the foregoing are applicable equally well for the purpose of reducing the speed of a motor and its load, either from full or normal speed to rest, or from any higher speed to a lower. This method is also illustrated in Fig. 1, but on the left side of the vertical axis. Here solid curve K represents the performance of the motor when driven by the inertia or potential energy of the load, as a generator with its normal, or least number, of poles. The torque of the motor is now negative, and will oppose the load and reduce its speed. Suppose for example, the motor to be running with a speed and negative torque corresponding to the point $k'$ on the curve K; then the speed will diminish; and when it has fallen to, say a point $k^2$, the number of poles is increased to that corresponding to the curve H, but at the same time there is impressed a voltage sufficiently above normal to bring the motor to another curve, such as H'. The motor is then allowed to drop in speed along H' until it reaches a suitable point, as $h'$, at which instant the voltage is changed to the value normal for the number of poles corresponding to curve H, thus bringing the motor to the point $h^2$. This process may be continued till the motor has been brought to rest or to the desired lower speed; or in the case where the motor has potential energy which it is desired to deliver to the line while maintaining the load at constant speed, as in the case of a train going down grade, the motor may be allowed to operate at any desired number of poles, thus maintaining the load at the speed corresponding to such number of poles, and continually delivering its potential energy to the line. By increasing the voltage simultaneously with the change or changes in the number of poles results are secured corresponding to those in the case described above for increasing the speed. That is, a higher negative torque is utilized, with consequently greater retarding force, or a fewer number of steps employed in increasing the number of poles from the smallest to the greatest number.

Referring now to Fig. 2, I show here in diagram a system arranged for practicing my invention, in which G is a source of single phase current, M a motor having a stationary element O, of any suitable type, as for example the Gramme ring shown, and a rotating induction element P. T indicates terminals connected to leads extending to the motor. It will here be seen, that as shown, the motor may be operated with four poles, and that for each pole there are three leads. By using a plurality of leads for each pole, as herein described, it is possible to secure in the primary winding any desired magnetic flux distribution. This feature I do not claim broadly in this application, but do so in my copending application, Serial No. 174,698. The connections of the auxiliary starting device, S, for the sake of simplicity, are shown as only one lead per pole for both main and auxiliary motor. The current supplied to the main motor directly from the transformer Q is delivered through three leads per pole; while in the case of the auxiliary motor S both the current thereto and the current therefrom to the main motor, are supplied through only one lead per pole. If, however, an efficiency for the current delivered to the main motor through the agency of the auxiliary S, comparable to that obtained with the current supplied through the transformer Q is desired, the auxiliary motor should, for supplying its out-of-phase component, have both from the source G and to the main motor the same number of leads per pole as there are per pole from the transformer to the main motor. Ordinarily the auxiliary is in use such a short time that the additional leads can in many cases be dispensed with, and I have therefore omitted them in the diagram to avoid unnecessarily complicating the figure. The auxiliary starting device here illustrated is selected merely as a type, and is represented as a two phase motor, either synchronous or induction, receiving current in one phase of its winding and delivering current from the other phase. In order to supply the three leads for each pole in the main motor, a transformer Q is introduced, having secondaries $s$ $s'$ $s''$, connected by leads $t$ $t'$ $t^2$ $t^3$ $t^4$ $t^5$ $t^6$ $t^7$ $t^8$, to the controller diagrammatically indicated at C. This latter is so designed, as will be seen by tracing out the connections, that in one position the motor will run with four poles; in the last position the connections will be for two poles.

Referring again to Fig. 1, it will be seen that the speed varies or changes, in either direction, by a series of steps. It is obvious that these steps may be made less abrupt by using a large number of poles for the highest speed, and increasing the number of steps in the complete change from or to this large number, so that the curves will more nearly merge. Beyond certain limits, however, this increase in the number of poles to increase the number of increments becomes impracticable. I have therefore devised a novel method of interpolating one or more speeds in each step, thus approximating the same result as with an impracticably large number of poles. The idea will be more readily understood from a concrete instance, and for this purpose let it be supposed that the motor has connections for a maximum of four poles, but is intended to run normally with two. In this case the reduction would be from 4 to 2. Instead, however, of making the change all around the motor, I change only a part thereof, as for example one-half, to the two-pole connection so that it is on one side connected for two-pole running, while on the other it is still connected for the four-pole. The motor will therefore run at a compromise speed between four and two poles. As soon as this speed is reached, or approximately reached, the four-pole side is changed to the two-pole connection, so that the entire motor is then connected for two poles. This method of reduction is illustrated diagrammatically in Fig. 7, in which N represents the motor with four-pole connections; N' the same with one side changed to two-pole connections; and N'' with the other side reduced to the two-pole connection. It is plain of course that the method is not limited in every case to one "interpolation", since the fractional parts of the motor, on which the changes are made, need not be halves but may be thirds, or quarters, or such other fractional parts as desired, if the number of poles will permit, thereby introducing two, three, or more speeds. It is also clear that this method is not confined to the case of a single phase induction motor, but may be applied to any motor in which the number of poles is varied, either by increasing or decreasing their number. A further advantage resulting from this method of changing the number of poles by making the change upon parts of the motor successively (or in any other suitable order), is the fact that there will be less tendency to destructive arcing, for the reason that at the instant of disconnecting the circuits in making the changes the power carried by the circuits disconnected is shifted, at the instant of break, to the circuits remaining connected. The controller illustrated at C, Fig. 2, is adapted for making an "interpolation". In the first position of the controller the motor is connected for four poles; in the next position one side of the motor is connected for two poles, while the other side remains as before, with four-pole connections; and finally in the last position, the motor is connected on both sides for two poles.

Referring now to Fig. 3, this figure shows a system arranged for the application of my method in the case of a polyphase motor, as for example one operated by two phases as shown. The quarter phase source is indicated by A B, between which and the motor are transformers Q, Q'. As will be seen by tracing out the connections, the motor has a maximum number of poles, four, and a minimum number, two, thereby giving two speeds. Each pole is supplied by two leads, instead of one as is ordinarily the case. The additional lead per pole is provided for the purpose of securing a desired magnetic flux distribution, as will be explained more fully hereinafter. The system illustrated in Fig. 3 also provides for supplying an abnormal voltage along with the change in the number of poles. For example, when starting the motor with the higher number of poles, with the switches R to the right, there is first impressed upon the motor a higher voltage, that is, higher than that which may be considered normal for that number of poles. The resulting curve of performance is analogous to the form taken by those in Fig. 1, with the important difference that the motor being self-starting from rest, the curve will, as previously explained, not begin at the origin, but somewhere out on the horizontal axis instead. The next change gives a lower voltage, which may be considered normal for that number of poles. In passing from the higher number to the lower number of poles a similar change of voltage takes place, that is, there is first impressed a higher or abnormal voltage, and then the normal. In coming from the lower number of poles to the higher, in reducing the speed of the motor, the switches R are thrown to the left, which results in a higher voltage at the instant the change in the number of poles is made.

The system shown in Fig. 4 is one which in some cases might be used instead of that shown in Fig. 3. It gives four poles with eight leads instead of sixteen, but the electrical chord between leads is twice as great. Fig. 5 shows the corresponding two-pole connection in this system. No controller is shown in either of these diagrams, as they are given simply to illustrate one of the ways in which the number of leads may be reduced in cases where the electrical chord between leads may be increased or where a lead may be made common to two phases. Or, the two-pole connection might be as in Fig. 6, but here the electrical chord is one-half that of the system shown in Fig. 5.

In Figs. 4, 5 and 6, A'—B' indicate the source of quarter-phase current, and P' indicates the primary winding of the machine. Q', Q'' indicate auto-transformers from which the plurality of leads per pole are supplied with current.

For reasons well known to those skilled in the art, it is ordinarily desirable that the E. M. F.'s induced in the circuits of a motor shall closely approximate a simple sine wave. This will be accomplished if the flux waves in these circuits closely approximate a simple sine. With a given flux distribution in the motor the flux wave in these circuits may for a given number of poles be made to be or to closely approximate a simple sine by properly choosing the width of the electric arc or chord embraced by these circuits; but if the desired end is attained in this way, any change in the number of poles, the flux distribution remaining the same, will result in a deviation from the approximation previously obtained, the degree of deviation depending upon the ratio of the new number of poles to the former number, being in general greater the more this ratio departs from unity. If the flux distribution in the motor were a simple sine or a close approximation thereto, the flux wave in the secondary circuits, no matter what their width, and no matter what the number of poles, would be a simple sine or a close approximation. We may, therefore, maintain such a flux wave in the circuits, whatever their width, by always maintaining in the motor a flux distribution which is a simple sine or a close approximation thereto; or we may maintain a close approximation to a sine wave under the conditions first mentioned (in which, with a distribution which is not a close approximation, an approximation to a simple sine flux wave is obtained by properly proportioning the width of the circuits), if on changing the numbers of poles we also change the flux distribution to a closer approximation to a simple sine. In other words, if for any reason it is desirable not to maintain a simple sine flux distribution, or an approximation thereto, under all conditions, an approximation to a simple sine flux wave may be maintained in the circuits by properly proportioning the width of the circuits for one number of poles and for the flux distribution which does not closely approximate a simple sine, and, when a change in the number of poles would cause the flux wave to depart from a simple sine to an objectionable extent, improving at the instant the number of poles is changed the flux distribution to a degree which will maintain the wave at the approximation desired.

In illustration of how a desired flux distribution may be obtained I will explain the method in connection with a single phase induction motor, though the method is applicable as well to polyphase induction motors, and to synchronous motors both single and polyphase. Referring now to Fig. 8, this shows at U a single phase, uniformly wound motor of two poles having its currents supplied at opposite ends of a diameter. The resulting flux wave in the motor is that shown at $u$, the values on the horizontal axis being distances around the circumference of the motor U, the length $d$—$d'$ corresponding to 180 degrees of the motor circumference. The quantities plotted on the vertical axis represent the magnetic flux intensity in the motor corresponding to the various points in its circumference plotted on the horizontal axis. In Fig. 10, V represents the same motor but with the currents led in at four points, $p, p', p^2, p^3$. The resulting flux distribution curve is $v$, which, as will be seen, is closer to a simple sine wave than is $u$, Fig. 8. The length of the flat portion of the curve $v$, indicated by $q$, depends upon the distance lead $p$ is from lead $p'$, and lead $p^2$ from lead $p^3$, and may be increased or diminished as desired, by correspondingly varying these distances. Fig. 14 shows at W the same motor, but with the current led in at six points. Solid curve $w$ shows the flux distribution (which, as will be seen, is a still closer approximation to a simple sine than is $v$), produced as the resultant of the components shown in dotted lines. It will be noticed that the two components are similar to curves $u$ and $v$ of Figs. 8 and 10 respectively. The relative magnitudes of the components may be varied by varying the relative values of the currents producing them, or, what is equivalent, by varying the relative values of the voltages impressed on the circuits through which the currents producing the components flow. It will be seen, therefore, that by varying the length of the flat portion of the component corresponding to $v$, and the relative magnitudes of the two components, we may obtain a close approximation to a simple sine wave. This method might be carried still further and currents led in at 8 or 10 points, or more, each increase in the number of currents led in enabling a still closer approximation. The method, which is of course applicable whatever the number of poles may be, or whatever the distribution may be which it is desired to approximate, or whether the winding be uniformly or non-uniformly distributed, is explained more in detail in my co-pending application, Serial Number 174,698, and claimed broadly therein, as before stated. Continuing, it may be said, in general, that the greater the number of leads per pole the more nearly can the flux distribution be made to approximate any desired distribution. For example, when approximating a sine flux distribution, the degree of approximation can ordinarily be made close enough with five leads per pole; and indeed even with less leads per pole than this, as for instance, two per pole or even at times with one. When for any reason the motor will not be operated for any great length of time at a given number of poles, so that its efficiency or the current taken by it at this number is not very important, a less favorable approximation to a sine distribution may not be seriously disadvantageous and consequently a small number of leads per pole may be employed. Such would often be the case with the very lowest speeds at which the motor is operated. This is an advantage, since with the comparatively large number of poles for these lower speeds any reduction in the number of leads per pole very materially reduces the total number of leads to the machine. So in operating a motor where the efficiency, and therefore the distribution, at the lower speeds is not so important it may often be found advisable to operate inefficiently, and with a fewer number of leads per pole, at the lower speeds, and increase the number per pole as the higher speeds are attained. I have, however, devised a plan by which, if desired, this coutse can be followed without serious sacrifice in efficiency at the lower speeds. This is the plan previously outlined, and consists in so proportioning the electrical arc or chord embraced by the secondary circuits of the motor that the flux wave in these circuits is a close approximation to that desired, even with the comparatively poor distribution obtained in the motor when the number of leads per pole is small, and as the number of poles is decreased and a greater number of leads per pole thus made available, improving the flux distribution by utilizing such leads and thus maintaining a good flux wave. This feature will be more fully described hereafter.

Referring again to Fig. 8, U represents, as before stated, the winding of a two-pole motor with one lead per pole, the leads being 180 degrees apart. The resulting flux distribution in the motor will be as indicated by the curve $u$, in which electrical degrees are plotted on the horizontal axis, from $d$ to $d'$ being 180 degrees, and flux intensity on the vertical axis. The curves $u^1$, $u^2$, $u^3$, Fig. 9, represent the flux waves generated by the flux distribution of curve $u$, in secondary coils whose widths are such that they embrace 180, 90 and 60 degrees respectively. The points on the horizontal axis of these curves represent the positions of the middle points of their respective coils. These positions correspond to those, on the horizontal axis of the curve $u$, at which the flux intensity values represented by the ordinates of $u$ are measured. The vertical ordinates of $u^1$, $u^2$, and $u^3$ represent not flux intensity as in $u$, but the total flux through the coils corresponding to the positions of their centers. In other words, if in the magnetic field of the motor U, the flux distribution of which is represented by the curve $u$, we rotate an electric circuit whose width is 180 degrees, the flux wave in this circuit will be the curve $u'$. If the width of the circuit is 90 degrees the flux wave in it will be $u^2$, and if 60 degrees, the curve $u^3$. The dotted curve, $u^4$, is a simple sine wave, assuming that this is the wave which it is desired to approximate. It will be noted that the curve $u'$, for the 180 degrees circuit, and $u^2$, for the 90 degree circuit, fall on opposite sides of the sine wave $u^4$. This shows that somewhere between 180 degrees and 90 degrees there is some width of circuit which will have in it a flux wave which is exactly, or which very closely approximates, a simple sine wave. This curve may be found by trial or calculation, but of course its determination is not necessary here. So far we have spoken of the motor U, which has two poles, and in which therefore, electrical degrees and degrees of arc are identical. The explanation already given in regard to the flux distribution wave, and the flux wave, will apply equally well to a motor with a greater number of poles, providing it be borne in mind in this case that the arcs mentioned are all electrical. In other words, if we should feed currents into the motor at four points instead of two, the flux distribution $u$ would still be obtained, but the distance $d—d'$, instead of being 180 degrees of arc, would be 180 electrical degrees, which in the case of the four poles corresponds to 90 degrees of arc. It should also be borne in mind that if with the four-pole connection we have a secondary circuit embracing 180 electrical degrees, and thus having in it a flux wave corresponding to $u'$, and that if we change from four poles to two poles, the same secondary circuit, which before embraced 180 electrical degrees, will then embrace only 90 electrical degrees, and will have in it the flux wave $u^2$. Also, if for the four pole connection we employ that width of circuit between 180 and 90 electrical degrees which will give the close approximation to a simple sine flux wave as previously described, then on changing the number of poles to two the flux wave in this secondary will depart more from the simple sine wave than does $u^2$, because the secondary now embraces less than 90 electrical degrees.

An explanation similar to that already given for Figs. 8 and 9 will apply to Figs. 10 and 11, but the latter represent conditions when two currents per pole are fed to the motor instead of one, as for example in the motor V, so spaced that the resulting flux distribution is that shown by curve $v$. The corresponding flux waves for the distribution curve $v$, in secondary circuits, embracing 90, 60 and 30 electrical degrees, are exemplified by curves $v^1$, $v^2$, $v^3$, respectively. Here, as before, the dotted curve, $u^4$, represents the simple sine wave which it is desired to approximate. In the case of $v^1$, the difference between the two is so small that they are practically coincident. It will be seen that $v^2$ also closely approximates a simple sine wave. It therefore follows that circuits of widths between 90 and 60 electrical degrees will have in them flux waves very close to the simple sine wave. Of course the curves $v^1$, $v^2$, $v^3$, are equally representative for a greater number of poles, it being remembered, as before, that the arcs concerned are in every case electrical.

It will now be clear, if we have a motor with one lead per pole (as in Fig. 8) for the four pole connection, and means for changing it to a two pole connection as in Fig. 10, and if we chose a width of secondary circuit such that with the four pole connection it has that value previously described, between 180 degrees and 90 degrees which gives the best or most advantageous flux wave, that on changing to the two pole connection with two leads per pole this circuit will have a width lying between 90 degrees and 60 degrees and will therefore have, for the latter connection, also a very close approximation to a simple sine flux wave.

Figs. 12 and 13 explain the plan previously mentioned for avoiding serious sacrifice of efficiency, in running at the lower speeds with few leads per pole. Fig. 12 shows the ordinary way of constructing the secondary of an induction motor, at the same time utilizing all the available copper space. The bars are all short-circuited to a common ring, and the electrical arc of each circuit is therefore that corresponding to the peripheral distance between adjacent bars or conductors. Fig. 13 shows my plan, alternate bars being connected, so the electrical arc is twice that in Fig. 12, and the available copper space all utilized. By connecting every third bar the arc will be three times that of Fig. 12, etc. Any desired width of arc may therefore be obtained.

In Fig. 15 is illustrated a system for practicing my invention in changing the number of poles and securing a desired flux distribution. The motor Y there shown is a single phase machine, with connections for four and two poles, with one lead per pole in the former arrangement. Each secondary circuit (not shown) is supposed to embrace 180 electrical degrees in the four pole connections, and therefore to have the flux curve for that arc shown in Fig. 9, it being assumed that this approximation to a simple sine wave is close enough for the purpose of starting and running for a short time at half speed. If the number of poles were doubled these circuits would embrace only 90 electrical degrees each. If therefore for the lesser number of poles the current be fed in at two points per pole, properly spaced, there will result the flux distribution shown in Fig. 10 and consequently the flux wave for a 90 degree arc in Fig. 11. From Fig. 9, and as has been previously explained, it is seen that between 180 degrees and 90 degrees there is some electrical chord which will give a very close approximation to a simple sine wave. This chord might have been determined by trial or calculation, and taken as that for the four pole connection, and another spacing between the two current leads per pole of the two pole connection determined such that the approximation for the two poles would also be very close. For a polyphase motor the sets of leads for each pole would be repeated for each phase, or each phase introduced into the motor by a set of leads with the common use of some or all of them for different phases.

It should be noted that, as shown in several of the figures but with particular clearness in Figs. 3, 4 and 5, it is often possible to improve the flux distribution without increasing the number of leads but by merely changing the method of their employment. A motor having a sharp flux distribution wave would, as will be clear by what has gone before, require one lead per pole per phase or, in the case of a two phase motor, four leads for two poles and eight leads for four poles; there being required a total of eight leads for a motor which is to operate at either two poles or four poles at pleasure. In Fig. 3 a flat top distribution has been obtained by employing two leads per pole per phase or sixteen leads for four poles and eight leads for two poles. In Fig. 4 a flat top distribution curve is obtained for four poles by using no more leads than for a sharp flux distribution curve, namely 8, and in Fig. 5 the same is true for two poles. That is, by the connections of Figs. 4 and 5 we may obtain from a motor of eight leads a two pole connection and a four pole connection with a flat top distribution curve in each case instead of having to use 16 leads as in Fig. 3. This arises from the fact that in Figs. 4 and 5 instead of using separate and distinct sets of leads for each phase we have made the sets for the two phases overlap and thus made each lead common to the two phases. This plan can be followed in obtaining flux distribution curves other than flat top ones in which there would be required more than the equivalent of two leads per pole per phase. It can also be applied to more than two phases. It should be borne in mind that the principle involved in obtaining a desired flux distribution is the same whether each phase has a separate and distinct set of leads to the motor for obtaining the distribution or whether part or all of the leads are common to two or more phases.

In certain of the claims the motor to which the invention is to be applied is defined as one capable of exerting torque at speeds other than synchronous. By this is meant a motor which, in contradistinction to a purely induction motor, which can never operate at synchronism, can operate at synchronous speed for any or for each of the different numbers of poles and at other speeds can exert torque like an induction motor.

As will be readily understood, the motors described in this application may be reversed in the ordinary way by reversing one or more phases as may be necessary in the case of the polyphase machine, and by reversing the main or the auxiliary phase in the case of the single phase motor supplied with an out of phase component of power.

What I claim is:

1. The method of increasing the speed of an alternating current motor adapted to operate with different numbers of poles, and inherently capable of delivering for each number of poles the same torque at two different speeds, and the speed of the load to which it may be connected, which consists in allowing the motor to attain for one number of poles the desired torque at the higher speed corresponding to the torque, and changing the number of poles so that the motor, with the new number of poles, has an equal torque at the lower speed corresponding to the torque, as and for the purposes set forth.

2. The method of decreasing the speed of an alternating current motor adapted to operate with different numbers of poles and inherently capable of exerting for each number of poles the same torque at two different speeds, and the speed of the load to which it may be connected, which consists in allowing the motor to attain for one number of poles the desired torque at the lower speed corresponding to the torque, and changing the number of poles so that the motor, with the new number of poles, has an equal torque at the higher speed corresponding to the torque, as and for the purposes set forth.

3. The method of varying the speed of a motor and that of the load to which it may be connected, between limits corresponding to different numbers of poles, which consists in making the change from one number of poles to the other on a portion of the motor and successively carrying on such change on the other portions until all the motor has been changed, as set forth.

4. The method of varying the speed of a motor and that of the load to which it may be connected, between limits corresponding to different numbers of poles, which consists in making the change from one number of poles to the other on a portion of the motor, and carrying on such change progesssively on successive portions until all the motor has been changed, as set forth.

5. The method of varying the speed of a motor and that of the load to which it may be connected, between limits corresponding to different numbers of poles, which consists in making the change from one number of poles to the other on a portion of the motor; allowing the motor to approximate the ultimate speed of which it is capable after the change; and repeating such steps on the remaining portion or portions of the motor until all the motor has been changed, as set forth.

6. The method of increasing the speed of an alternating current motor adapted to operate with different speeds with different numbers of poles and inherently capable of delivering for each number of poles the same torque at two different speeds, and the speed of the load to which it may be connected, which consists in allowing the motor to attain for one number of poles the desired torque at higher speed corresponding to the torque and changing the number of poles and the voltage so that the motor, with the new number of poles and the new voltage, has an equal torque at the lower speed corresponding to the torque as and for the purposes set forth.

7. The method of decreasing the speed of an alternating current motor adapted to operate with different numbers of poles and inherently capable of exerting for each number of poles the same torque at two different speeds and the speed of the load to which it may be connected, which consists in allowing the motor to attain for one number of poles the desired torque at the lower speed corresponding to the torque, and changing the number of poles and the voltage so that the motor, with the new number of poles and the new voltage, has an equal torque at the higher speed corresponding to the torque, as and for the purposes set forth.

8. The method of bringing an alternating current motor, capable of exerting torque at speeds other than synchronous, along with that of the load to which it may be connected, from a lower speed corresponding to a greater number of poles to a higher speed corresponding to a lesser number of poles, which consists in reducing the number of poles, and increasing the voltage to a value in excess of that normally desired at or near synchronism for the new number of poles, so that at the instant the change has been completed and at the speed then existing the torque with the new number of poles and the new voltage will be sufficient to carry the load at increasing speed, then allowing the motor to increase in speed until it approximates synchronism for the new number of poles, as the speed increases, reducing the voltage to that normally desired; as and for the purposes set forth.

9. The method of bringing an alternating current motor capable of exerting torque at speeds other than synchronous, along with that of the load to which it may be connected, from a lower speed corresponding to a greater number of poles to a higher speed corresponding to a lesser number of poles, which consists in reducing the number of poles, and increasing the voltage to a value in excess of that normally desired at or near synchronism for the new number of poles, so that at the instant the change has been completed and at the speed then existing the torque with the new number of poles and the new voltage will be sufficient to carry the load at increasing speed, then allowing the motor to increase in speed until it approximates synchronism for the new number of poles, and as the speed increases, reducing the voltage to that normally desired; again reducing the number of poles and increasing the voltage as described, allowing the motor to attain approximately synchronous speed, and as the speed rises reducing the voltage to normal; and repeating such steps until the desired ultimate speed is reached, as and for the purposes set forth.

10. The method of bringing an alternating current motor, capable of exerting torque at speeds other than synchronous, along with that of the load to which it may be connected from a higher speed corresponding to a lesser number of poles to a lower speed corresponding to a greater number of poles, which consists in increasing the number of poles, and decreasing the voltage to a value in excess of that normally desired at or near synchronism for the new number of poles, so that at the instant the change has been completed and at the speed then existing the negative torque with the new number of poles and the new voltage will be sufficient to produce retardation, then allowing the motor to decrease in speed until it approximates synchronism for the new number of poles, and as the motor decreases in speed, decreasing the voltage to that normally desired; as and for the purposes set forth.

11. The method of bringing an alternating current motor, capable of exerting torque at speeds other than synchronous, along with that of the load to which it may be connected, from a higher speed corresponding to a lesser number of poles to a lower speed corresponding to a greater number of poles, which consists in increasing the number of poles, and decreasing the voltage to a value in excess of that normally desired at or near synchronism for the new number of poles, so that at the instant the change has been completed and at the speed then existing the negative torque with the new number of poles and the new voltage will be sufficient to produce retardation, then allowing the motor to decrease in speed until it approximates synchronism for the new number of poles, and as the motor decreases in speed, decreasing the voltage to that normally desired; again increasing the number of poles and decreasing the voltage as described, allowing the motor to attain approximately synchronous speed, and as the speed decreases, decreasing the voltage to that normally desired; and repeating such steps until the desired ultimate speed is reached, as and for the purposes set forth.

12. The method of starting an alternating current motor adapted to operate with different numbers of poles, and inherently capable of delivering for each number of poles the same torque at two different speeds, and the load to which the motor may be connected, which consists in bringing it, by auxiliary means, to a speed approximating that of synchronism for one number of poles; and changing the number of poles so that the motor has with the new number of poles, the same or greater torque at the lower speed corresponding to that torque, as and for the purposes set forth.

13. The method of starting a single phase induction motor adapted to operate with different numbers of poles, and inherently capable of delivering for each number of poles the same torque at two different speeds, and the load to which it may be connected, which consists in supplying to the motor a component of power displaced in phase from that of the main supply circuit, until the motor attains approximately synchronous speed for one number of poles; then disconnecting the source of displaced power component; and changing the number of poles so that the motor with the new number of poles, has the same or greater torque at the lower speed corresponding to that torque, as and for the purposes set forth.

14. The method of starting a single phase induction motor, adapted to operate with different numbers of poles, and inherently capable of delivering for each number of poles the same torque at two different speeds, and the load to which it may be connected, which consists in supplying to the motor a component of power displaced in phase from that of the main supply circuit, until the motor attains approximately synchronous speed for one number of poles; then disconnecting the source of the displaced power component; and reducing the number of poles and increasing the voltage so that the motor has the same or greater torque at the lower speed corresponding to that torque with the new number of poles and the new voltage, as and for the purposes set forth.

15. The method of starting a single phase induction motor and the load to which it may be connected, which consists in supplying to the motor a component of power displaced in phase from that of the main supply circuit, until the motor attains approximately synchronous speed for one number of poles; then disconnecting the source of the displaced power component; reducing the number of poles and increasing the voltage to a value in excess of that normally desired at or near synchronism for the new number of poles, so that at the instant the change has been completed and at the speed then existing the torque with the new number of poles and the new voltage will be sufficient to carry the load at increasing speed, then allowing the motor to increase in speed until it approximates synchronism for the new number of poles, and as the speed increases, reducing the voltage to that normally desired; as and for the purposes set forth.

16. The method of starting a single phase induction motor and the load to which it may be connected, which consists in supplying to the motor a component of power displaced in phase from that of the main supply circuit, until the motor attains approximately synchronous speed for one number of poles; then disconnecting the source of displaced power component; reducing the number of poles and increasing the voltage to a value in excess of that normally desired at or near synchronism for the new number of poles, so that at the instant the change has been completed and at the speed then existing the torque with the new number of poles and the new voltage will be sufficient to carry the load at increasing speed, then allowing the motor to increase in speed until it approximates synchronism for the new number of poles, and as the speed increases, reducing the voltage to that normally desired; again reducing the number of poles and increasing the voltage as described, allowing the motor to attain approximately synchronous speed, and as the speed rises, reducing the voltage to normal; and repeating such steps until the desired ultimate speed is reached, as and for the purposes set forth.

17. The method of varying the speed of an alternating current motor along with that of the load to which it may be connected and maintaining a given approximation to a given flux distribution, which consists in changing the number of poles by such step or steps that after each step has been completed, the torque, positive or negative, will be sufficient to cause change of speed toward that corresponding to the new number of poles, and feeding into the winding the number of currents per pole necessary to produce the approximation desired.

18. The method of varying the speed of an alternating current motor along with that of the load to which it may be connected and of obtaining for each pole number a desired approximation to a given flux distribution, which consists in changing the number of poles by such step or steps that after each step has been completed the torque, positive or negative will be sufficient to cause change of speed toward that corresponding to the new number of poles, and for each number of poles feeding into the motor winding the current or number of currents per pole necessary to produce the approximation desired for that pole number.

19. The method of increasing the speed of an alternating current motor capable of exerting torque at other speeds than synchronous, along with that of the load to which it may be connected, and keeping the magnetic flux waves in the secondary circuits of the motors within any desired limit of departure from a given flux wave, which consists in decreasing the number of poles by such step or steps that after each step has been completed the torque will be sufficient to cause increase of speed until by such decrease of pole number the limit of departure from the given flux wave has been approached, then increasing with the next step the number of currents per pole led into the motor winding to such as will bring the flux wave farther within the said limit of departure, then decreasing the pole number by the step or steps described until the said limit has again been approached, and continuing the process until the desired speed has been reached.

20. The method of decreasing the speed of an alternating current motor capable of exerting torque at other speeds than synchronous along with the load to which it may be connected and keeping, with the minimum number of currents per pole fed into the motor winding, the magnetic flux waves in the secondary circuits or the motor within any desired limit of departure from a given flux wave which consists in increasing the number of poles by such step or steps that after each step has been completed the negative torque will be sufficient to cause retardation until by such increase of pole number the flux waves in the secondary circuits are such that with the next step the number of currents per pole may be reduced without exceeding the flux wave limit aforesaid, making this next step and reducing the number of currents and continuing the steps in pole number described until the number of currents may again be reduced, continuing this process until the speed desired has been attained.

21. The method of changing the speed of an alternating current motor along with that of the load to which it may be connected from a speed corresponding to one number of poles to that corresponding to another number of poles, and of maintaining in the motor any desired degree of approximation to the best flux distribution, which consists in changing the number of poles by such step or steps that after each step has been completed the torque, positive or negative, will be sufficient to cause a change in speed toward that corresponding to the ultimate number of poles, and changing with the last step the number of currents per pole fed into the winding or windings of the motor to that which will produce the desired degree of approximation to the best flux distribution.

22. The method of varying the speed of an alternating current motor along with that of the load to which it may be connected and of maintaining in the motor any desired degree of approximation to the best flux distribution desired, which consists in changing the number of poles by such a number that after the change has been completed the torque, positive or negative, will be sufficient to cause a change of speed toward that corresponding to the new number of poles, and changing with the change in the number of poles the number of currents per pole fed into the winding or windings of the motor to that which will produce the desired degree of approximation to the desired flux distribution.

23. In an electric motor of which one element is adapted for variation in its pole numbers by variation in the number of points at which currents are led into its winding or windings, and for variation in its flux distribution by variation in the number of currents per pole fed into its winding or windings, and of which the other element has electric circuits of such width or embracing such an electric chord as will cause to be produced in them for one flux distribution and for one or more pole numbers, an approximation to a desired flux wave which shall fall within a given limit of departure from the desired flux wave, the method of varying the speed of the motor along with that of the load to which it may be connected and maintaining the flux wave within the limit set, which consists in varying the number of poles in the first element by such step or steps that the torque, positive or negative, at the instant a step has been completed and at the speed then existing, will be sufficient to cause change of speed toward synchronism for each new number of poles; and when the departure from the given flux wave caused by change in the number of poles approaches the predetermined limit, so that the next variation would cause the limit to be exceeded, changing with the next variation in the number of poles the flux distribution by changing the number of points per pole at which the current or currents are fed into the first element to the minimum number necessary for the flux distribution which will maintain the flux wave within the predetermined limit as set forth.

RALPH D. MERSHON.

Witnesses:
S. S. DUNHAM,
THOS. J. BYRNES.